Dec. 14, 1937.    H. H. HOKE, JR    2,102,531
AUTOMATIC CONTROL FOR AUTOMATIC TALKING MACHINES
Filed Oct. 7, 1936    3 Sheets-Sheet 1
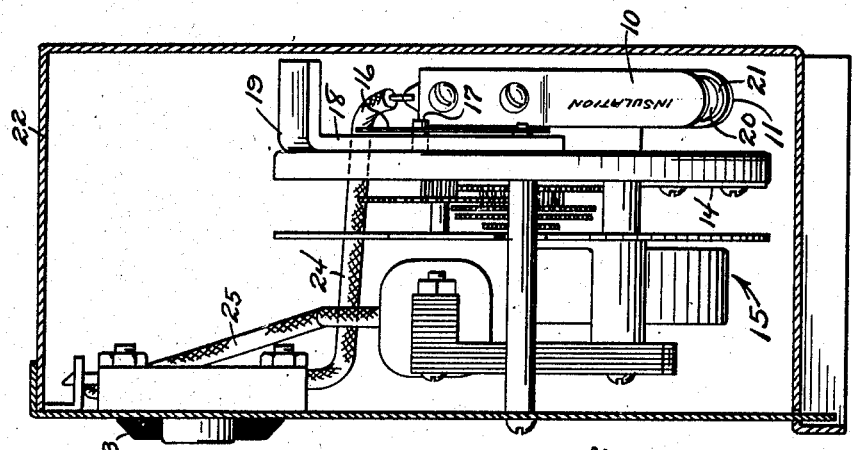
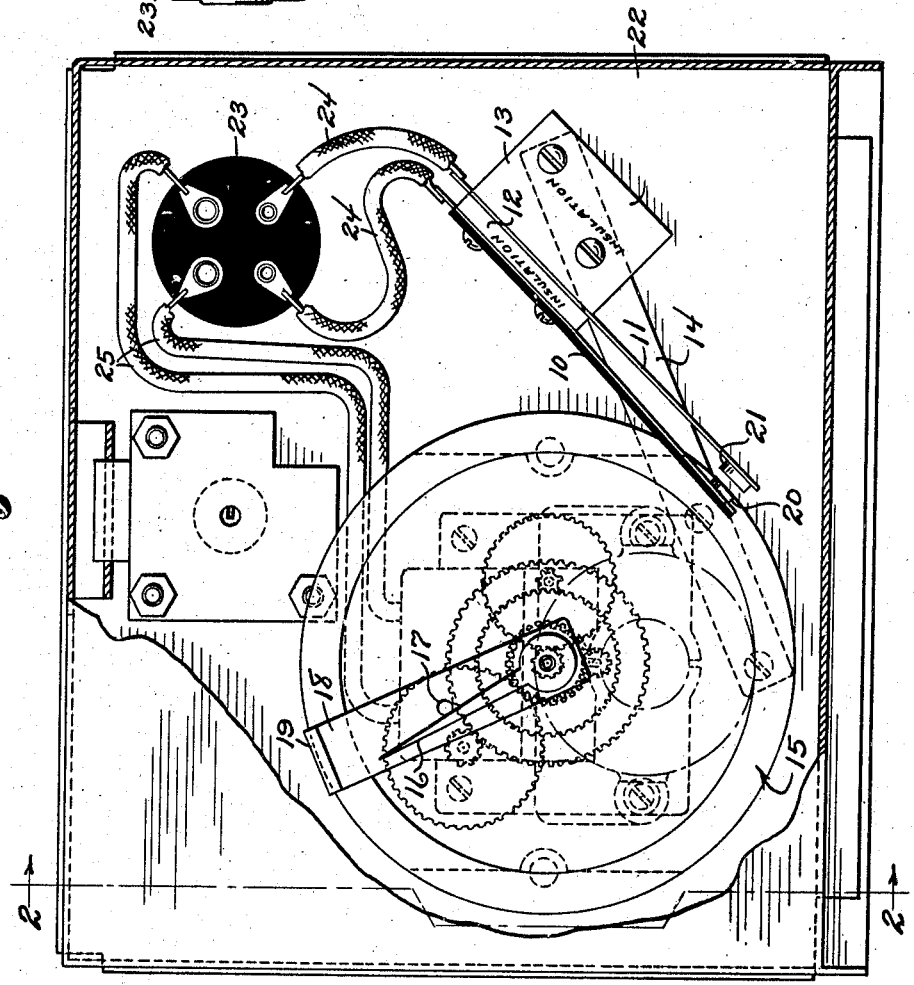
Harry H. Hoke, Jr.
INVENTOR
BY Victor J. Evans & Co.
ATTORNEYS

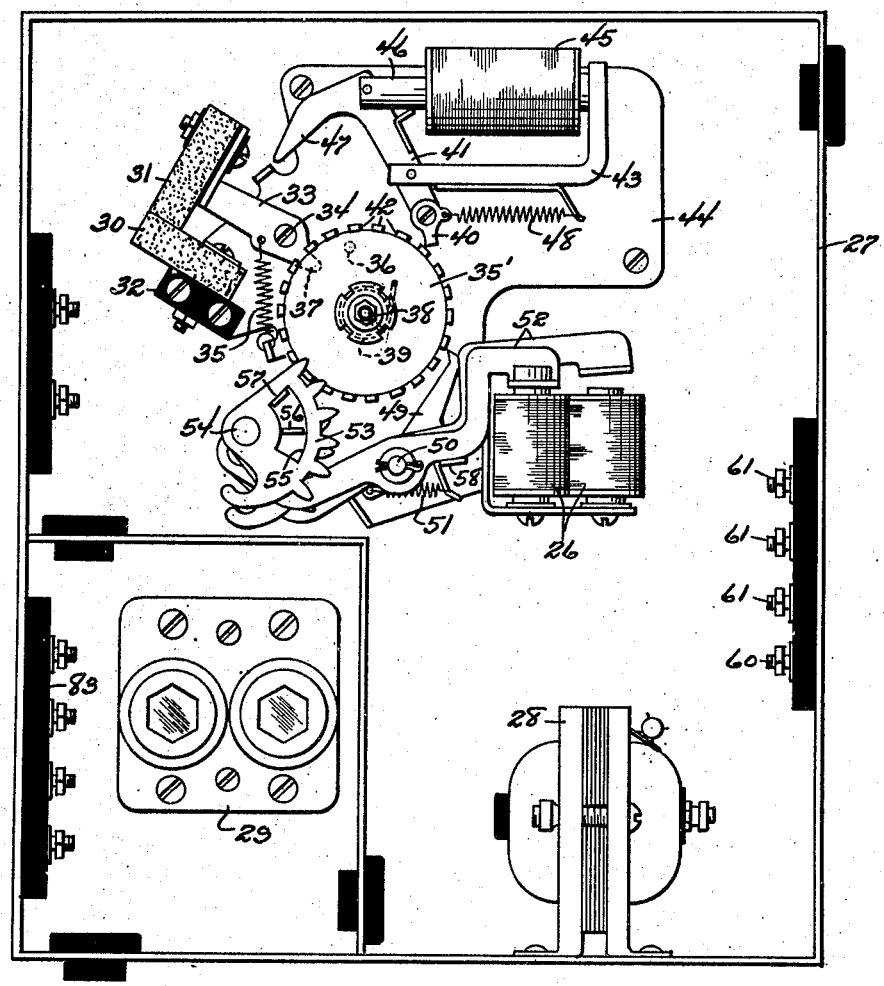

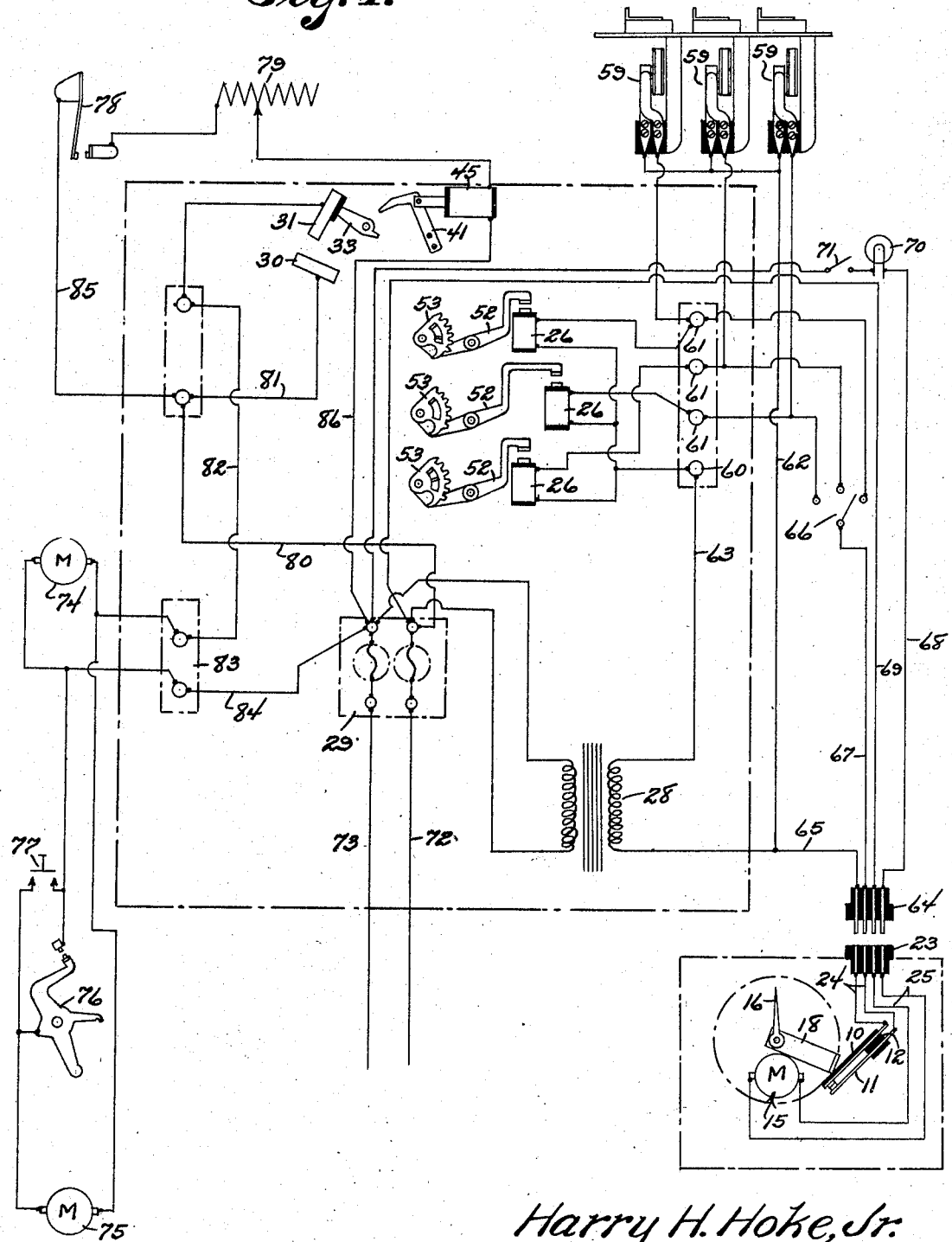

Patented Dec. 14, 1937

2,102,531

UNITED STATES PATENT OFFICE 2,102,531

AUTOMATIC CONTROL FOR AUTOMATIC TALKING MACHINES

Harry H. Hoke, Jr., Washington, D. C.

Application October 7, 1936, Serial No. 104,531

3 Claims. (Cl. 194—15)

The object of the invention is to provide means for use in connection with a conventional coin controlled automatic talking machine whereby the latter will be automatically actuated at fixed time intervals, as for example, every hour, so as to stimulate interest in a possible audience and thereby induce some listener to continue the operation which he can do only by the expenditure of a coin; to provide means where the talking machine is operable through the use of a plurality of coin controlled appliances adapted for actuation with coins of different denominations, whereby the automatic control can be made to selectively function in the manner of any one of the coin controlled devices; to provide means whereby the Ferris wheel motor of such a machine may be manually set in operation in the event of the failure of the automatic switch to function as a result of a broken record or from other causes; and generally to provide an automatic attachment for such machines which is of simple form and susceptible of application without any modification of the machine structure.

With this object in view, the invention consists in a construction and combination of parts of which a preferred embodiment is illustrated in the accompanying drawings, wherein:

Figure 1 is an elevational view, partly broken away, showing the time controlled switch of the invention.

Figure 2 is a sectional view on the plane indicated by the line 2—2 of Figure 1.

Figure 3 is an elevational view of the master switch control mechanism and the housing therefor in which are included the main fuse block and transformer, all of these constituting elements of the machine.

Figure 4 is a diagrammatic view showing the wiring and the manner in which the invention is included therein.

Designed to function in the manner of the usual coin controlled switch, the time switch of the invention comprises the spring leaves 10 and 11 insulated from each other, as indicated at 12, and mounted on a block of insulation 13 secured on an appropriate bracket 14 extending from the frame of the clock motor 15, the latter being the conventionally operated clock mechanism which may, or may not, be provided with a dial from which the time may be read. The clock mechanism is modified to the extent of having the minute spindle provided with an arm 16, in the path of movement of which is a pin 17, the latter constituting a projection from a flat metal strip 18 having a swinging or pivotal mounting on the minute spindle, so that it may swing freely in an arc with the center of the minute spindle as an axis. The strip 18 is provided with an angularly turned end 19 and in its swinging movement, this end will engage and wipe the upper face of the spring leaf 10 and engage its free extremity which is provided with a contact 20 with the complemental contact 21 with which the leaf 11 is provided.

As the arm 16 moves upwardly, it engages the pin 17 and carries the strip 18 up with it until the arm begins its downward movement, when the strip will drop by gravity which results in its angular end 19 wiping the leaf 10 and closing the switch.

In the case 22, housing the clock movement, is mounted a receptacle 23, the latter being adapted for the reception of a four prong plug of which one pair of the receptacle contacts are connected by means of conductors 24 and with the leaves 10 and 11 respectively and the other set of contacts connected by means of conductors 25 with the clock motor.

The switch composed of the leaves 10 and 11 functions jointly with any of the coin controlled switches to control the circuit on the magnets 26 of the master switch control mechanism which is mounted in an appropriate case 27 along with a transformer 28 and fuse block 29. In the illustrated embodiment, there are three coin controlled switches and hence three of the magnets 26, the energizing of any one of which will result in master switch operation, the master switch comprising the fixed and movable carbon blocks 30 and 31, of which the former is mounted on an insulated block 32 secured to the wall of the case 27 and the latter on a swinging arm 33 from which it is insulated, electric connection being made with the block 31 preferably by a pigtail connector. The arm 33 has a pivotal mounting on an appropriate screw stud 34 and is provided with a tension spring 35 which impels it toward the block 30. There is a gravital tendency to effect engagement of the block 31 with the block 30 but the spring insures firm electrical contact and at such times, the circuit on the motors is closed.

The master switch is moved to open position through the instrumentality of a rotary disk 35' which is provided with a lateral pin 36 engageable with a tail extension 37 on the arm 33. The disk is rotatably mounted on the stud 39 and is spring impelled in a right hand direction as viewed in Figure 3 by means of a torsion spring 39. The spring tends to move the disk in a direction to carry the pin 36 away from the tail 37 but the disk is moved in the opposite direction by means of a pawl 40 which is carried at the lower end of a rock lever 41, the pawl engaging the teeth 42 in one direction of movement of the lever but dragging over the teeth in the other direction of lever movement. The teeth 42 are formed by slitting the disk radially and then bending the teeth down so that they constitute lateral extensions from the disk and define a cylindrical surface consisting of an intercurrent series of ribs and spaces.

The lever 41 is a lever of the first order and is pivotally mounted at the extremity of a bracket arm 43 which is carried by the frame 44 which supports the other parts of the master switch mechanism, the bracket 43 also supporting the long range magnet 45, whose core 46 has a pin and slot connection with the upper end of the lever 41, said upper end being formed with an angularly turned extremity 47 to provide a gravitally actuated means to cause the upper section or force arm of the lever to swing laterally and downwardly and therefore draw the core 46 of the magnet out of the latter. A tension spring 48 connected with the lever where the pawl 40 is joined with the latter serves to swing the lever in a direction opposite to that in which it is swung when the magnet is energized.

A hold-back pawl 49 has a pivotal mounting on the pin 50 carried by the frame 44 and is provided with a tension spring 51 which impels its nose toward the teeth 42 of the disk 35. This pawl functions to restrain rotary movement of the disk in the direction in which it is impelled by the torsion spring 39.

In addition to the pawl 49, there are also mounted on the pin 50 the levers 52, the force arms of which are formed so that their extremities will be disposed over and constitute armatures for the magnets 26. Each lever, at the extremity of its resistance arm, carries a toothed sector 53 pivotally mounted on the lever, as indicated at 54, the sector being provided with an arcuate slot 55 through which projects an ear 56, the latter constituting an integral lateral projection from the lever and a means to limit the angular or turning movement of the sector on its pivot by reason of engaging the extremities of the arcuate slot. The sector at the upper end of its slot is provided with a lateral ear constituting a stop means to engage the ear 56. When the magnets 26 are de-energized, the resistance arms of the levers drop and the sectors swing on their pivotal mountings until the ears 57 and 56 are in engagement. When any magnet 26 is energized, the force arm of its attendant lever is drawn down and the resistance arm raised. This brings the initial tooth of the connected sector in between the teeth 42 of the disk and the disk is then free to rotate through the instrumentality of the spring 39, the lever of the pawl 49 having been disengaged from the teeth 42 by the movement of the lever, since the pawl is provided with an ear 58 extending laterally therefrom and underlying the lower edges of all of the levers 52, so that in the depression of the resistance of the force arm of any one, pawl release is effected.

With the pawl disengaged and the disk 35' free to rotate, such rotation continues in a right hand direction, rotating the engaged sector in a left hand direction, until the lower end of the slot 55 abuts the ear 56. No further movement of the disk 35 is then possible and when the resistance arm of the lever drops, as it will when the magnet 26 is de-energized, the pawl 49 swings back into its restraining position by reason of the action of the spring 51. In this operation, the pin 36 which previously engaged the tail 37 of the arm 33 and thereby held the master switch in open position, is moved a specified distance away from the tail extension and the master switch moves to closed position in consequence. The sectors 53 have their arcuate slots 55 of different lengths, so that the pin 36 will be shifted away from the tail 37 different distances, depending on which of the magnets 26 is energized.

The magnets 26 are each controlled by a coin controlled or coin actuated switch 59. The one terminal of each of the magnets is connected in common to a binding post 60 and the other terminals to the binding post 61. Each of the switches 59 has a terminal connected to the two-way binding post 61 and the other terminals are connected in common by a conductor 62 with one terminal of the secondary of the transformer 28 of which the other terminal is connected by means of a conductor 63 with a binding post 60. Energy in the secondary will thus flow to any one of the magnets 26, depending on which of the switches 59 is operated and one is for actuation by a coin of one denomination, another by a coin of a second denomination and a third by a coin of still a different denomination, as when it is desired to play one, two or say five records at one operation, the sectors 53 having their slots 55 cut of lengths to permit movement of the disk 36 to effect master switch opening operation after one, two or five records have been played, depending on the magnets 26 energized.

The plug 64 has the two prongs which connect with the sockets in the receptacle 23 with which the conductors 24 are connected in respectively on the conductors 62 by a conductor 65 and with the movable element of a three pole switch 66 by a conductor 67, the stationary elements or contacts of the switch 66 being connected one to each of the binding posts 61. By this arrangement the switch comprising the leaves 10 and 11 can be connected in parallel with any one of the switches 59 to function at the time periods for which the time controlled switch is designed to operate. The remaining prongs of the plug 64 are connected to the outlet side of the fuse block 29 by conductors 68 and 69, one of these, including a lamp 70 and a switch 71. The clock motor is energized by current flowing over the conductors 68 and 69 and the lamp being in series will indicate when the clock motor is operated, the switch 71 serving to control the operation of the clock motor.

By reason of the transformer 28, the magnets 26 operate at a low potential and the primary of the transformer is connected in on the outlet side of the fuse block 29 to which current is fed by the main line conductors 72 and 73.

The motors 74 and 75 actuate respectively the record tables and the Ferris wheel and the latter is controlled by an automatic switch 76 which is shunted with a manual switch 77. These motors are fed through the master switch, so that when it is in closed position, the motors are on closed circuit except during such time as the automatic switch 76 is in open position, this switch being of the form and operating in the manner of the similarly controlled switch shown in Patent No. 1,911,707 of May 30, 1933.

The magnet 45 of the master control switch mechanism is connected across the output end of the fuse block but in series with a normally open table controlled switch 78 and a variable resistance 79 for adjustment to suit the magnet best to the working conditions.

When any one of the coin controlled switches is operated, its associated magnet 26 will be energized, current flowing from the secondary of the transformer 28 over the conductor 62, through the switch 59 which has been actuated, thence to the binding post 61, thence through the magnet 26, thence to the binding post 60 and back to the transformer over the conductor 63. The disk 35' will then be rotated in a right hand direction by reason of the actuation of the lever 52 connected with the actuated magnet and the pin 36 will be moved in a right hand direction as before described. This will result in the release of the arm 33 and consequently in the engagement of the blocks 31 and 30 when current will flow from the line wire 72 through the fuse block over the conductor 80, the conductor 81, across the engaged blocks of the master switch and thence over the conductor 82 to one binding post of the terminal block 83, thence through the motors 74 and 75 and back to the other side of the line over the conductor 84.

When the record whose table has been rotated by the motors 74 is concluded, it will actuate the switch 78 to move the latter to closed position, when current from one side of the line will flow over the conductor 80, the conductor 85, the switch 78, the resistance 79, the magnet 45 and thence back to the other side of the line over the conductor 86. This will result in energizing the magnet 45 and its core being sucked in, the pawl will return the disk 35' a definite angular distance toward master switch opening position. If the single record coin switch 59 has been actuated, this return movement will result in master switch opening movement, for the disk 35 will then have already turned its minimum distance in a right hand direction to which it was limited by the particular sector 53 functioning. If either of the other coin controlled switches has been operated, the disk movement will have been further in the right hand direction and operation of the switch 78 will result in its return only a part of that initial movement, so that master switch opening movement will be effected either on the next operation of the switch 78, or on the fifth operation of the latter thereafter, depending on whether the two record or five record coin controlled switch has been actuated.

In the same manner in which the coin controlled switch governs the master switch movement, so does the automatic switch comprising the leaves 10 and 11. Every time that switch is operated which is at definite time periods, one of the magnets 26 is energized and which will depend on the setting of the switch 66. Then, current from the secondary of the transformer can flow over the conductor 65, through the time controlled switch, over the conductor 67, the switch 66, one of the magnets 26 and the conductor 63 back to the secondary of the transformer. The other parts will then function as described in connection with the time controlled switches. The purpose of the shunt switch 77 is to enable the Ferris wheel motor to be actuated by means of a manual control in the event of the failure of the automatic switch 76 which may occur as a result of broken records or for other causes that might prevent the Ferris wheel motor from functioning.

The invention having been described, what is claimed as new and useful is:

1. In a talking machine adapted to play one or more of a plurality of records and in which there is a Ferris wheel provided with record tables arranged in a circular series and on each of which a record is carried, a motor for rotating the Ferris wheel, a motor for driving each record table as the latter is brought into operative position with respect to it, a master switch controlling the motors, record governed means for operating the master switch, and a coin controlled switch operatively connected with the last said means to render the latter operative, the combination of a time controlled switch in parallel with the coin controlled switch to automatically effect positive operation of the master switch at fixed time intervals independently of the coin controlled switch.

2. In a talking machine adapted to play one or more of a plurality of records and in which there is a Ferris wheel provided with record tables arranged in a circular series and on each of which a record is carried, a motor for rotating the Ferris wheel, a motor for driving each record table as the latter is brought into operative position with respect to it, a master switch controlling the motors, record governed means for operating the master switch, and a plurality of coin controlled switches operatively connected with the last said means to selectively render the latter operative for any one of several predetermined different time periods, the combination of a time controlled switch in parallel with one of the coin controlled switches to automatically effect positive operation of the master switch at fixed time intervals independently of such coin controlled switch but for the particular time period which such coin controlled switch governs.

3. In a talking machine adapted to play one or more of a plurality of records and in which there is a Ferris wheel provided with record tables arranged in a circular series and on each of which a record is carried, a motor for rotating the Ferris wheel, a motor for driving each record table as the latter is brought into operative position with respect to it, a master switch controlling the motors, record governed means for operating the master switch, and a plurality of coin controlled switches operatively connected coin controlled switches operatively connected with the last said means to selectively render the latter operative for any one of several predetermined time periods, the combination of a time controlled switch and means for selectively connecting it in parallel with any one of the coin controlled switches to automatically effect positive operation of the master switch at fixed time intervals independently of the selected coin controlled switch but for the particular time period which such coin controlled switch governs.

HARRY H. HOKE, Jr.